United States Patent
Tulyakov et al.

(10) Patent No.: US 12,094,135 B2
(45) Date of Patent: Sep. 17, 2024

(54) IMAGE LANDMARK DETECTION

(71) Applicant: Snap Inc., Santa Monica, CA (US)

(72) Inventors: Sergey Tulyakov, Marina del Rey, CA (US); Roman Furko, Marina del Rey, CA (US); Aleksei Stoliar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 192 days.

(21) Appl. No.: 17/829,644

(22) Filed: Jun. 1, 2022

(65) Prior Publication Data

US 2022/0292866 A1    Sep. 15, 2022

Related U.S. Application Data

(63) Continuation of application No. 17/138,177, filed on Dec. 30, 2020, now Pat. No. 11,354,922, which is a (Continued)

(51) Int. Cl.
*G06T 7/277* (2017.01)
*G06F 18/214* (2023.01)
*G06T 7/246* (2017.01)
*G06T 7/73* (2017.01)
*G06T 11/60* (2006.01)
(Continued)

(52) U.S. Cl.
CPC .......... *G06T 7/277* (2017.01); *G06F 18/2148* (2023.01); *G06F 18/2155* (2023.01); *G06T 7/246* (2017.01); *G06T 7/73* (2017.01); *G06T 11/60* (2013.01); *G06V 10/25* (2022.01); *G06V 10/764* (2022.01); *G06V 10/7747* (2022.01); *G06V 10/7753* (2022.01); *G06V 10/776* (2022.01); *G06V 10/82* (2022.01); *G06V 20/20* (2022.01); *G06V 20/40* (2022.01); *G06V 40/10* (2022.01); *G06V 40/168* (2022.01); *G06T 2207/10016* (2013.01); *G06T 2207/20081* (2013.01); *G06T 2207/20084* (2013.01); *G06T 2207/20132* (2013.01); *G06V 10/62* (2022.01); *G06V 2201/07* (2022.01)

(58) Field of Classification Search
None
See application file for complete search history.

(56) References Cited

U.S. PATENT DOCUMENTS 3,748,754 A * 7/1973 LaBerge .................. G06F 7/62
                                                          434/335
8,924,735 B2   12/2014 Forbes et al.
(Continued)

OTHER PUBLICATIONS

"U.S. Appl. No. 16/277,710, Non Final Office Action mailed Mar. 2, 2020", 13 pgs.

(Continued)

*Primary Examiner* — Jason A Pringle-Parker
(74) *Attorney, Agent, or Firm* — Schwegman Lundberg & Woessner, P.A.

(57) ABSTRACT

A landmark detection system can more accurately detect landmarks in images using a detection scheme that penalizes for dispersion parameters, such as variance or scale. The landmark detection system can be trained using both labeled and unlabeled training data in a semi-supervised approach. The landmark detection system can further implement tracking of an object across multiple images using landmark data.

19 Claims, 16 Drawing Sheets

Related U.S. Application Data continuation of application No. 16/277,710, filed on Feb. 15, 2019, now Pat. No. 10,909,357.

(51) Int. Cl.

| | |
|---|---|
| *G06V 10/25* | (2022.01) |
| *G06V 10/62* | (2022.01) |
| *G06V 10/764* | (2022.01) |
| *G06V 10/774* | (2022.01) |
| *G06V 10/776* | (2022.01) |
| *G06V 10/82* | (2022.01) |
| *G06V 20/20* | (2022.01) |
| *G06V 20/40* | (2022.01) |
| *G06V 40/10* | (2022.01) |
| *G06V 40/16* | (2022.01) |

(56) References Cited

U.S. PATENT DOCUMENTS

| | | | |
|---|---|---|---|
| 9,547,908 B1* | 1/2017 | Kim | G06V 40/162 |
| 10,909,357 B1 | 2/2021 | Tulyakov et al. | |
| 2006/0133672 A1* | 6/2006 | Li | G06V 40/165 |
| | | | 382/190 |
| 2008/0187213 A1* | 8/2008 | Zhang | G06V 40/171 |
| | | | 382/159 |
| 2010/0067764 A1* | 3/2010 | Lu | G06T 7/73 |
| | | | 382/131 |
| 2011/0164787 A1 | 7/2011 | Legagneur et al. | |
| 2011/0301447 A1* | 12/2011 | Park | G06T 7/0016 |
| | | | 600/407 |
| 2012/0134564 A1* | 5/2012 | Zheng | G06T 7/149 |
| | | | 382/131 |
| 2013/0121545 A1* | 5/2013 | Feng | G06T 7/149 |
| | | | 382/128 |
| 2013/0216110 A1* | 8/2013 | Zheng | G06T 7/0012 |
| | | | 382/128 |
| 2014/0314290 A1 | 10/2014 | Dabbah et al. | |
| 2014/0322682 A1 | 10/2014 | Baym et al. | |
| 2015/0279117 A1* | 10/2015 | Schimke | G06V 40/172 |
| | | | 345/633 |
| 2015/0286885 A1 | 10/2015 | Bulan et al. | |
| 2016/0328875 A1* | 11/2016 | Fang | G06V 40/176 |
| 2016/0360970 A1* | 12/2016 | Tzvieli | A61B 5/0075 |
| 2017/0076142 A1* | 3/2017 | Chang | G06T 7/11 |
| 2017/0112575 A1 | 4/2017 | Li et al. | |
| 2017/0173289 A1* | 6/2017 | Lucey | A61M 16/06 |
| 2018/0352150 A1 | 12/2018 | Purwar et al. | |
| 2019/0130580 A1 | 5/2019 | Chen et al. | |
| 2019/0138834 A1* | 5/2019 | Collet Romea | G06T 19/006 |
| 2019/0347761 A1 | 11/2019 | Han et al. | |
| 2019/0370533 A1* | 12/2019 | Han | G06V 40/171 |
| 2020/0019686 A1 | 1/2020 | Min et al. | |
| 2021/0192198 A1* | 6/2021 | Tulyakov | G06V 40/168 |

OTHER PUBLICATIONS

"U.S. Appl. No. 16/277,710, Notice of Allowance mailed Sep. 28, 2020", 5 pgs.

"U.S. Appl. No. 16/277,710, Response filed Jul. 2, 2020 to Non Final Office Action mailed Mar. 2, 2020", 10 pgs.

"U.S. Appl. No. 17/138,177, Notice of Allowance mailed Feb. 9, 2022", 9 pgs.

"U.S. Appl. No. 17/138,177, Preliminary Amendment filed Mar. 19, 2021", 7 pgs.

Honari, Sina, et al., "Improving Landmark Localization with Semi-Supervised Learning", arXiv:1709.01591v6 [cs.CV], (May 24, 2018), 17 pgs.

Wang, Wei, et al., "Recurrent Convolutional Shape Regression", IEEE Transactions on Pattern Analysis and Machine Intelligence, 40(11), (2018), 14 pgs.

\* cited by examiner

IMAGE LANDMARK DETECTION

CLAIM OF PRIORITY

This application is a continuation of U.S. patent application Ser. No. 17/138,177, filed on Dec. 30, 2020, which is a continuation of U.S. patent application Ser. No. 16/277,710, filed on Feb. 15, 2019, which applications are incorporated herein by reference in their entirety.

TECHNICAL FIELD

The present disclosure generally relates to special-purpose machines that manage image processing and improvements to such variants, and to the technologies by which such special-purpose machines become improved compared to other special-purpose machines for processing of image features.

BACKGROUND

Landmark detection is a computational task in which image features are detected and labeled in an image. For example, an image of a user can be analyzed to detect landmarks including a face area, a mouth area, a nose area, eye areas, and so on. Detected landmarks can then be used for additional image processing tasks, such as manipulating landmark areas of a face using the landmark data. While landmark detection can enable useful image processing tasks, landmark detection schemes are computationally intensive and run poorly on computers with limited resources, such as mobile computing devices (e.g., a smartphone, a tablet).

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
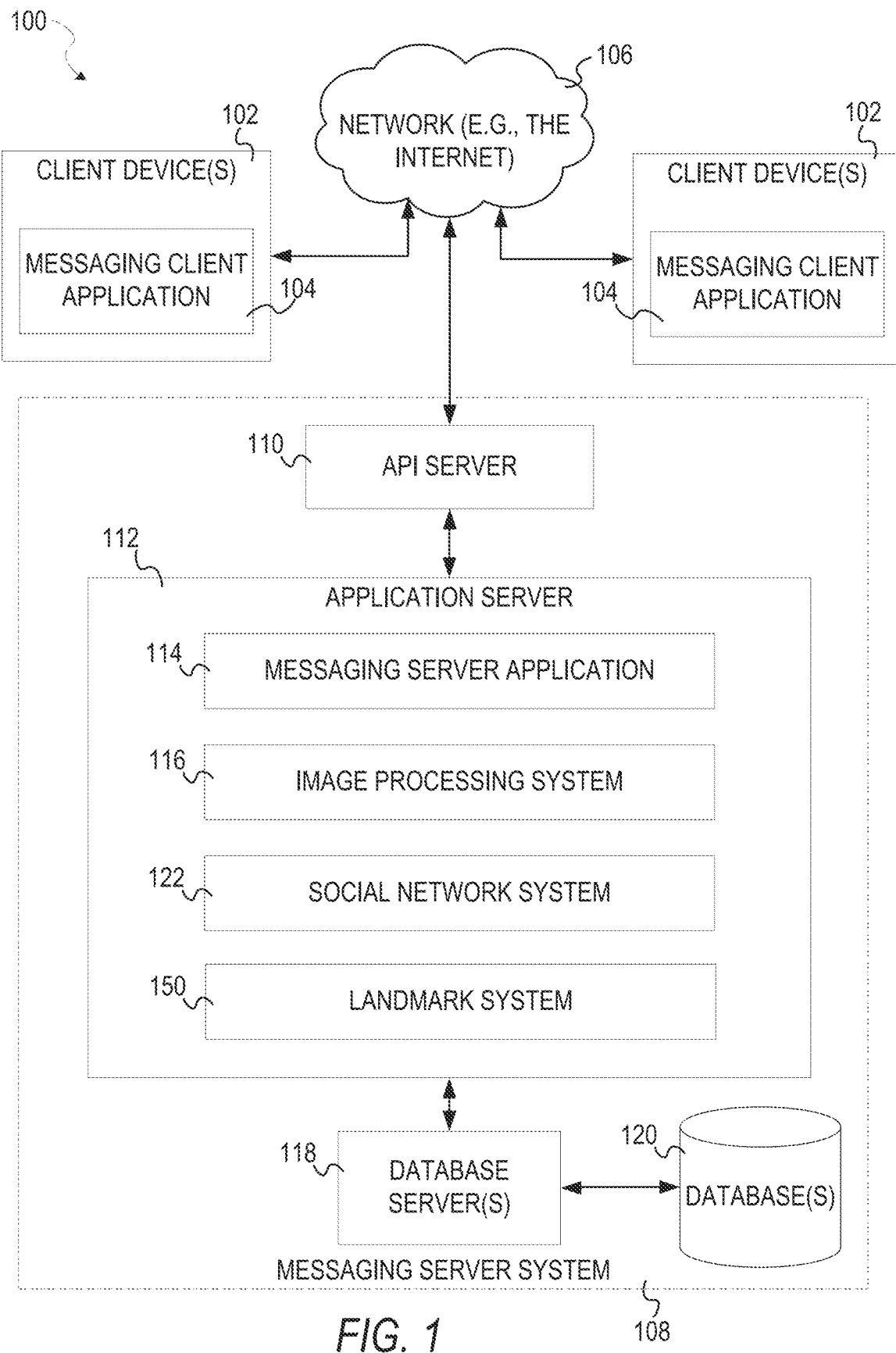
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Landmark detection is a computer vision task of finding pixel locations in images that correspond to points of interest. In the case of face alignment, such landmark points correspond to parts of a face. For instance, a landmark detection scheme analyzes pixels and determines whether a given pixel likely depicts an eye, nose, mouth and so on of a user depicted in the image. The landmark data (e.g., labeled pixels) can then be used to add a visual effect to the user's face using the location data as landmarks (e.g., a zany effect can be applied to the user's face, such as enlarging the user's eyes and shifting them farther apart, to give the user an alien-like appearance). As an additional example, for body or hand landmarks, landmarks correspond to the projections of joints to the camera plane.

Some landmark localization schemes are trained using labeled data that is modeled using objectives based on L1 or L2 norms (e.g., a loss function that uses an L1 norm, a loss function that uses an L2 norm). One issue that arises with these approaches is that they only penalize for location (mean) parameters of distributions and ignore deviation parameters. Generally, different distributions can be implemented for landmark detection, including a Gaussian distribution and Laplacian distribution. Each of the distributions have two parameters, a mean parameter and a deviation parameter, where the deviation parameter is referred to as variance in the Gaussian case and scale in the Laplacian case. Ignoring the deviation value parameters effectively ignores the "scatter" or dispersion of the detected points, which in turn limits the overall certainty of the detected landmarks and the quality of the end results generated using conventional approaches.

Further, many of these approaches are limited by the availability of suitable training data. In particular, some past approaches that rely on training on labeled datasets as loss computation involve ground truth location analysis (e.g., determining the difference between a predicted location and a ground truth location). However, labeled data is typically difficult to obtain and often requires users to manually create the labeled data set (e.g., a user going through 1,000 images of a human face, and labeling different parts of the face in each of the images). Thus, conventional landmark detection schemes can only be implemented if sufficiently large sets of labeled training data exist.

To this end, a semi-supervised landmark detection system can increase certainty of the detected landmarks by introducing a training mechanism that penalizes for differences in mean value parameters of distributions to increase landmark detection certainty. In some example embodiments, the landmark system penalizes differences between distributions of predicted and ground truth labels using a specially configured Laplace KL-divergence loss. The KL-divergence loss of the landmark system penalizes according to the distribution of the predicted landmark locations not matching the ground truth landmark locations based on the assumption that each landmark is a random variable distributed with Laplace (s, 1) distribution.

Further, the landmark detection system can be trained on unlabeled data using an adversarial network. This enables the landmark detection system to be trained on larger sets of data, thereby increasing model accuracy and the quality of results. In some example embodiments, the landmark system comprises a generator stage and an adversarial stage. The generator stage generates landmarks as normalized probability maps (e.g., heat maps). The adversarial stage comprises a discriminator network that learns the true distribution of the heat maps and provides gradients to improve predictions to the generator by injecting unlabeled data into the generator stage in end-to-end training. While the job of the adversarial stage may be made more difficult due to the stricter Laplace KL divergence loss scheme, which penalizes the mean value parameters of predictions, this difficulty is offset by using large sets of unlabeled training data to further refine the model.

In some example embodiments, the landmark system can be configured to perform object tracking across different images or frames of a video sequence. As used here, a frame is an image from an image sequence, such as a video sequence. In some example embodiments, to perform tracking the landmark system can first use an object recognition neural network (e.g., a neural network configured to perform object recognition) to identify an object in a first image of an image sequence. The approximate location of the object in the first image is then stored as a region of interest (ROI) data (e.g., ROI coordinates within an image). The subsequent image can then be cropped using the ROI based on the assumption that the object in the subsequent image is located near or within the ROI. The landmark detection system then detects landmarks in the subsequent image by applying the landmark detection model that has been trained with unlabeled data and the KL divergence loss scheme. The detected landmarks can then be used to apply an image effect to the object depicted in the subsequent image. In some example embodiments, each frame is cropped using ROI data from a previous frame, undergoes landmark detection, undergoes image manipulations, and is integrated back into the uncropped version of the image, which is then displayed on a display device in real time or near real time.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a landmark system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to a database server 118, which facilitates access to a database 120 in which is stored data associated with messages processed by the messaging server application 114. In some example embodiments, the application server 112 hosts one or more engines of the landmark system (e.g., landmark system 210) for efficient processing. For example, training of the landmark system machine learning model may can be performed on the application server 112, and the trained model can then be distributed to landmark systems running on different client devices.

The landmark system 150 is a server-side instance comprising one or more functional engines discussed with reference to FIG. 6 below. For example, the landmark system 150 on the server side can comprise a detection engine, a tracking engine 615, and a training engine 630. The training engine 630 trains an architecture including a generator network (e.g., generator 1020) and a discriminator network (e.g., discriminator network 1060) in end-to-end training. After the generator model is trained, the landmark system 150 distributes the trained model for application to user images (e.g., landmark detection of images in a video sequence).

Figure 2:
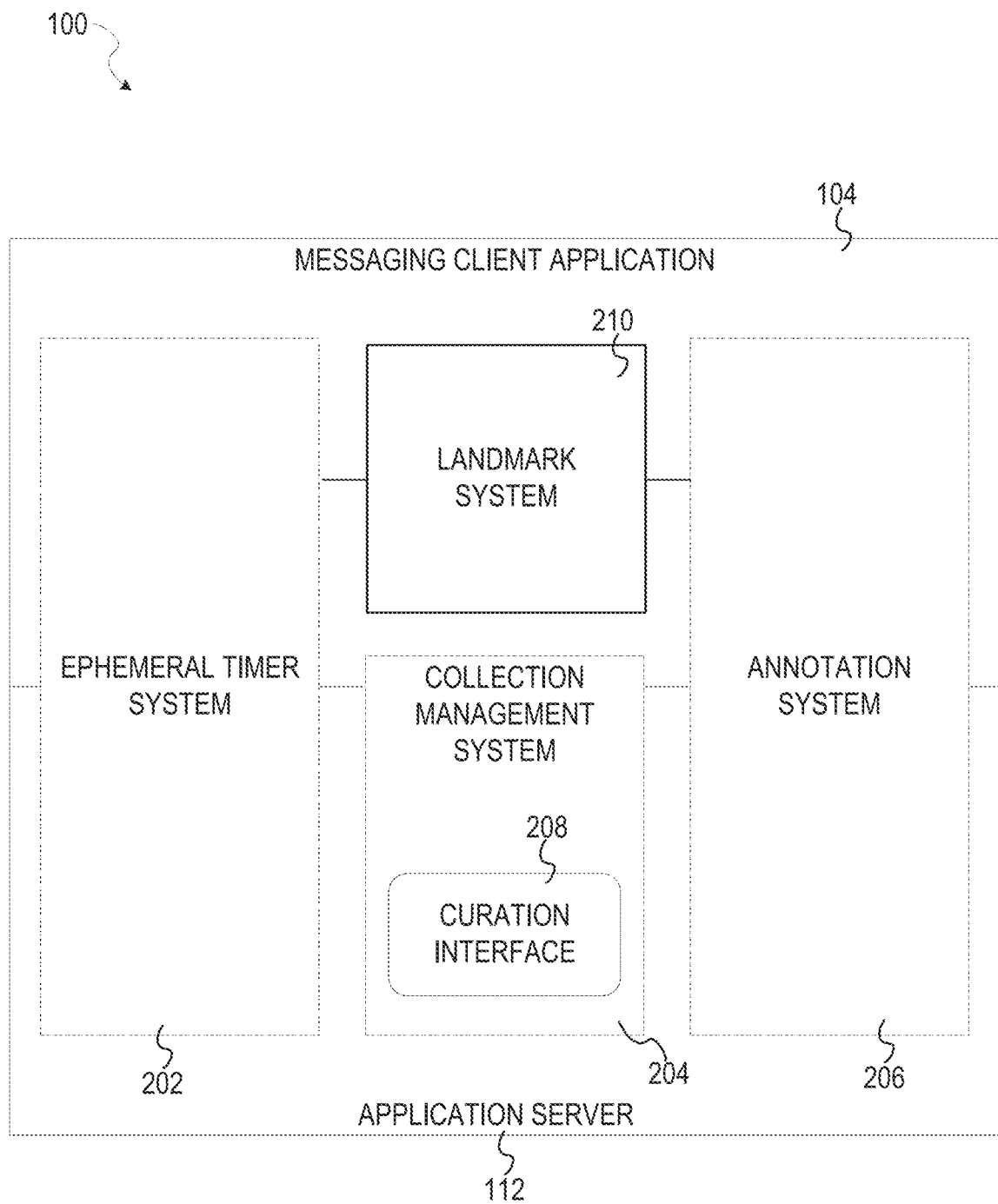
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a landmark system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

As discussed in further detail below, landmark system 210 is configured to display icon and icon content based on the display settings and location data of a client device 102.

Figure 3:
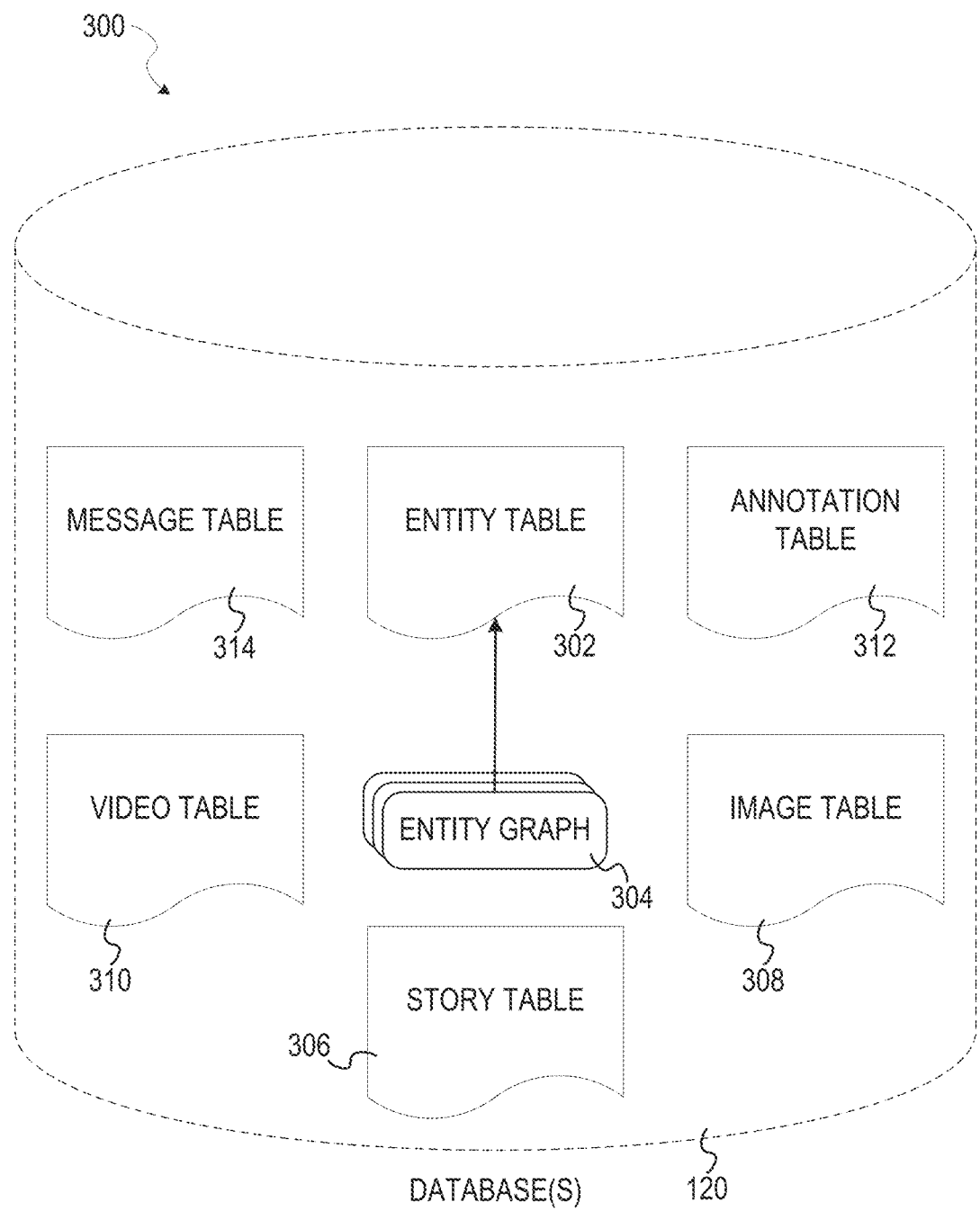
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
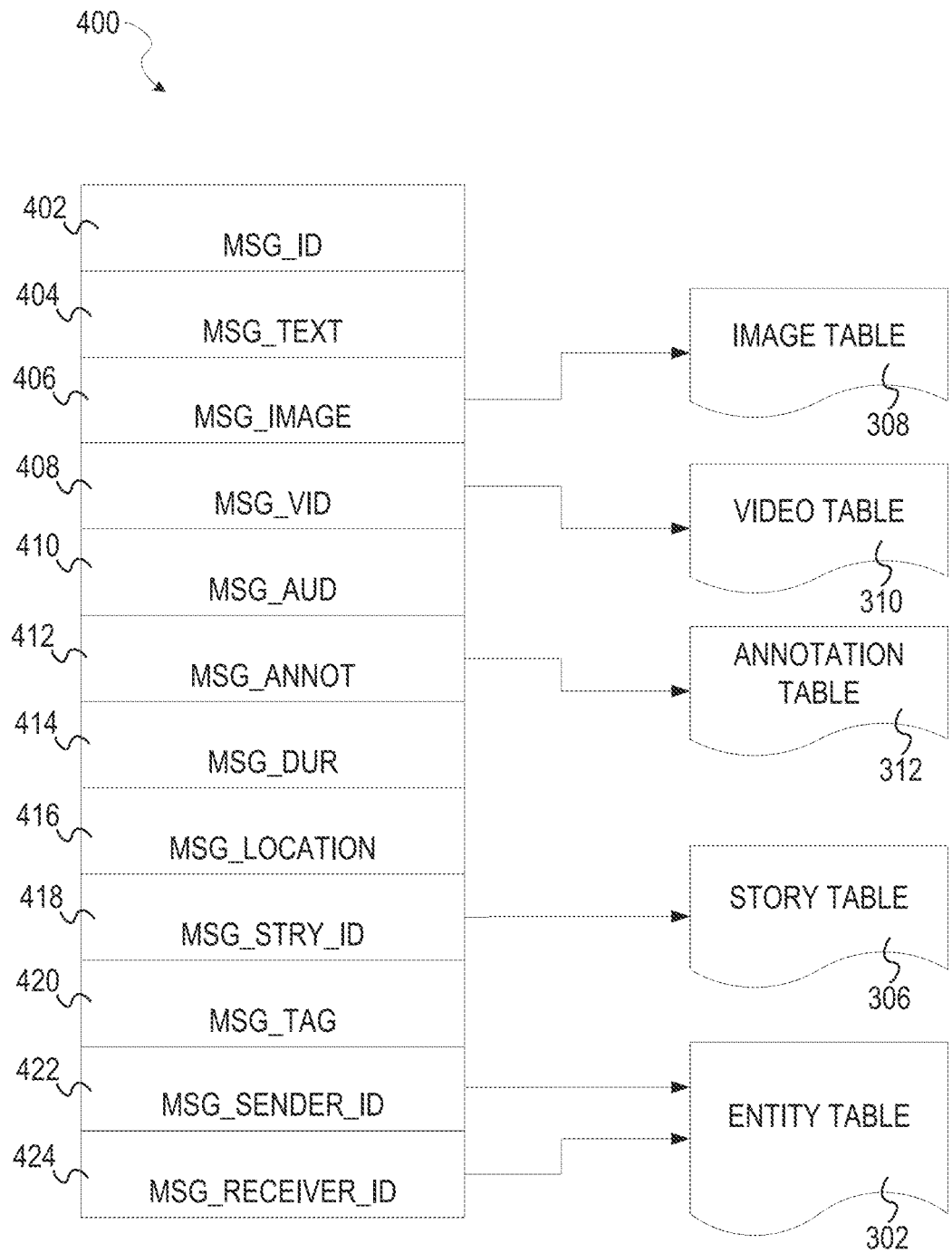
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
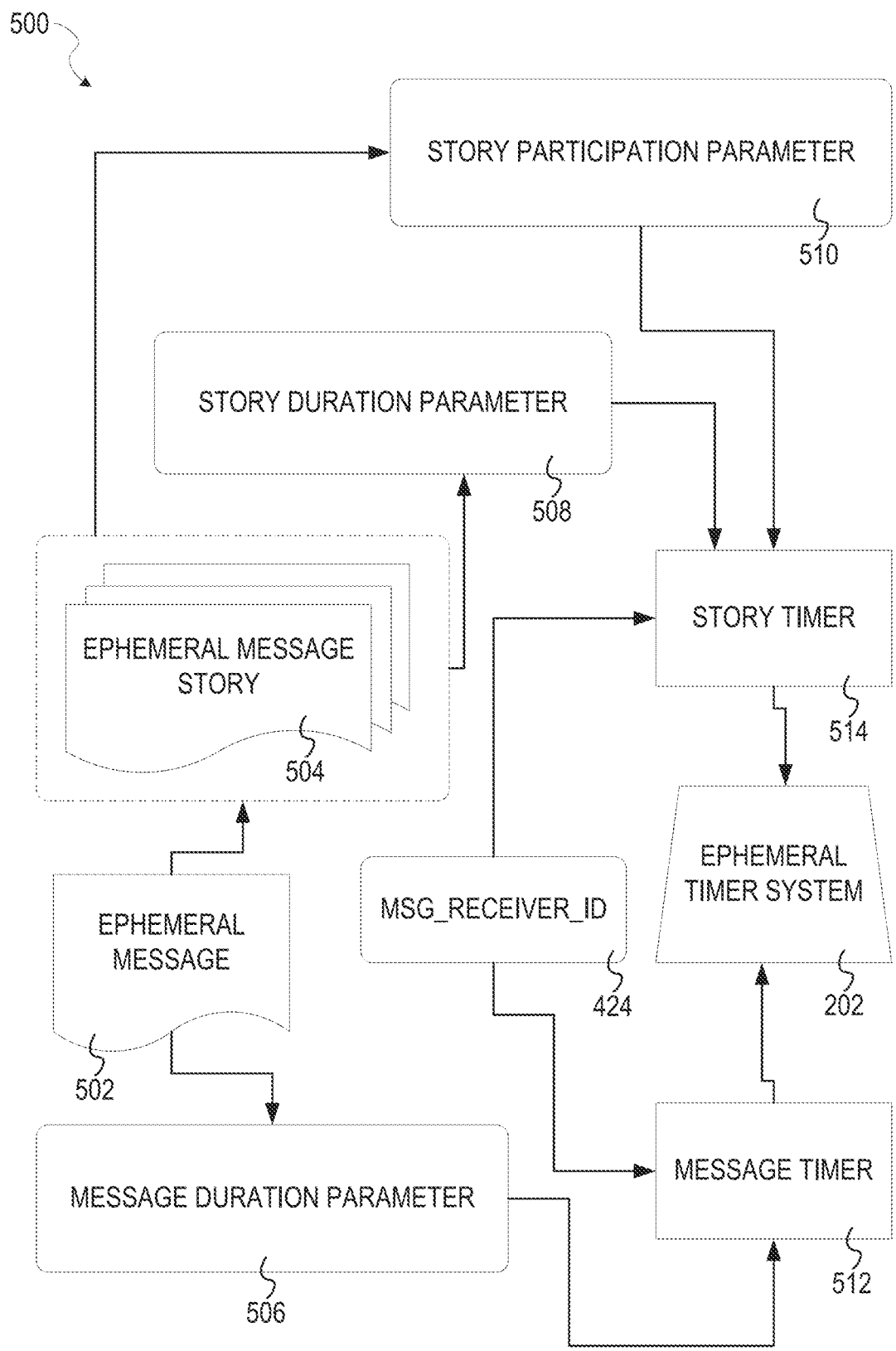
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
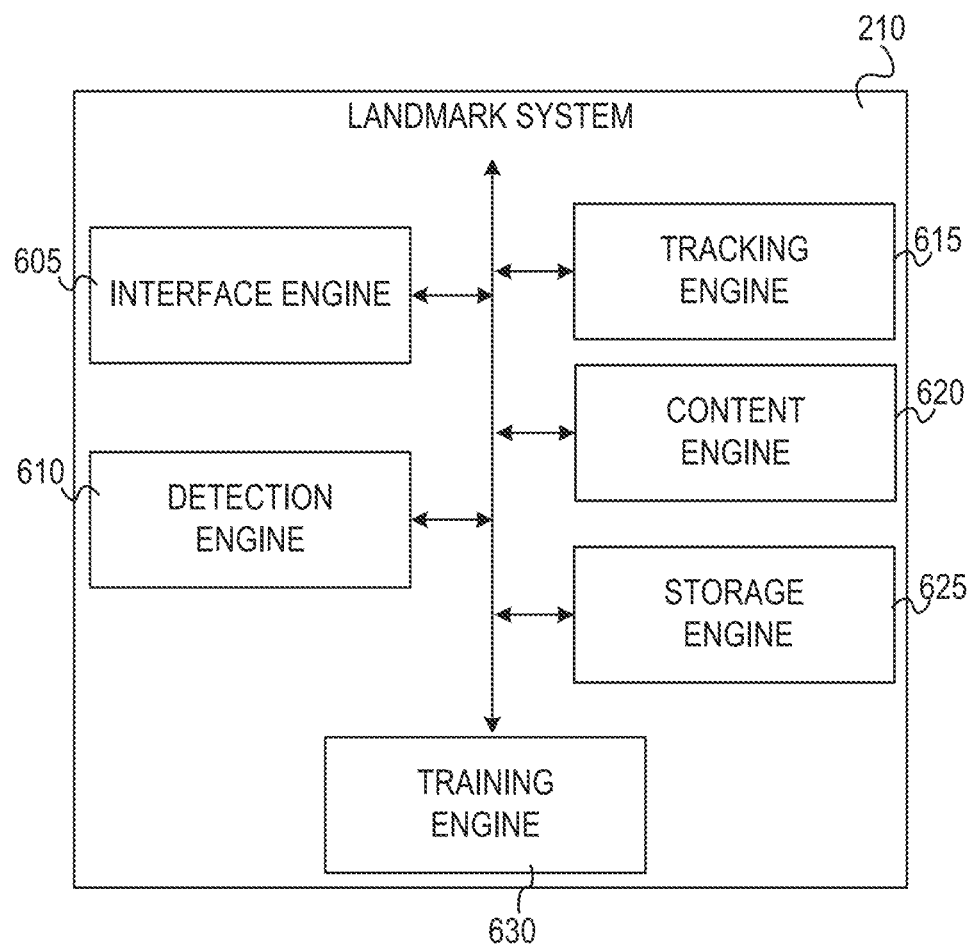
FIG. 6 shows internal functional engines of a landmark system, according to some example embodiments.

FIG. 6 shows internal functional engines of a landmark system 210, according to some example embodiments. As illustrated, the landmark system 210 comprises an interface engine 605, a detection engine 610, a tracking engine 615, a content engine 620, a storage engine 625, and a training engine 630. The interface engine 605 manages receiving user input (e.g., a user input to initiate landmark detection) and generating images (e.g., generating image or video using an image sensor). The detection engine 610 manages object detection, region of interest creation and storage, and landmark detection using different architectures (e.g., architecture 1000 discussed in FIG. 10A). The tracking engine 615 manages tracking an object across one or more images, e.g., frames of a video sequence. The content engine 620 is configured to apply an effect to one or more images using landmark data. The storage engine 625 manages storing modified images or video and distribution of the modified images or video. The training engine 630 is configured to train a landmark detection generator model.

Figure 7:
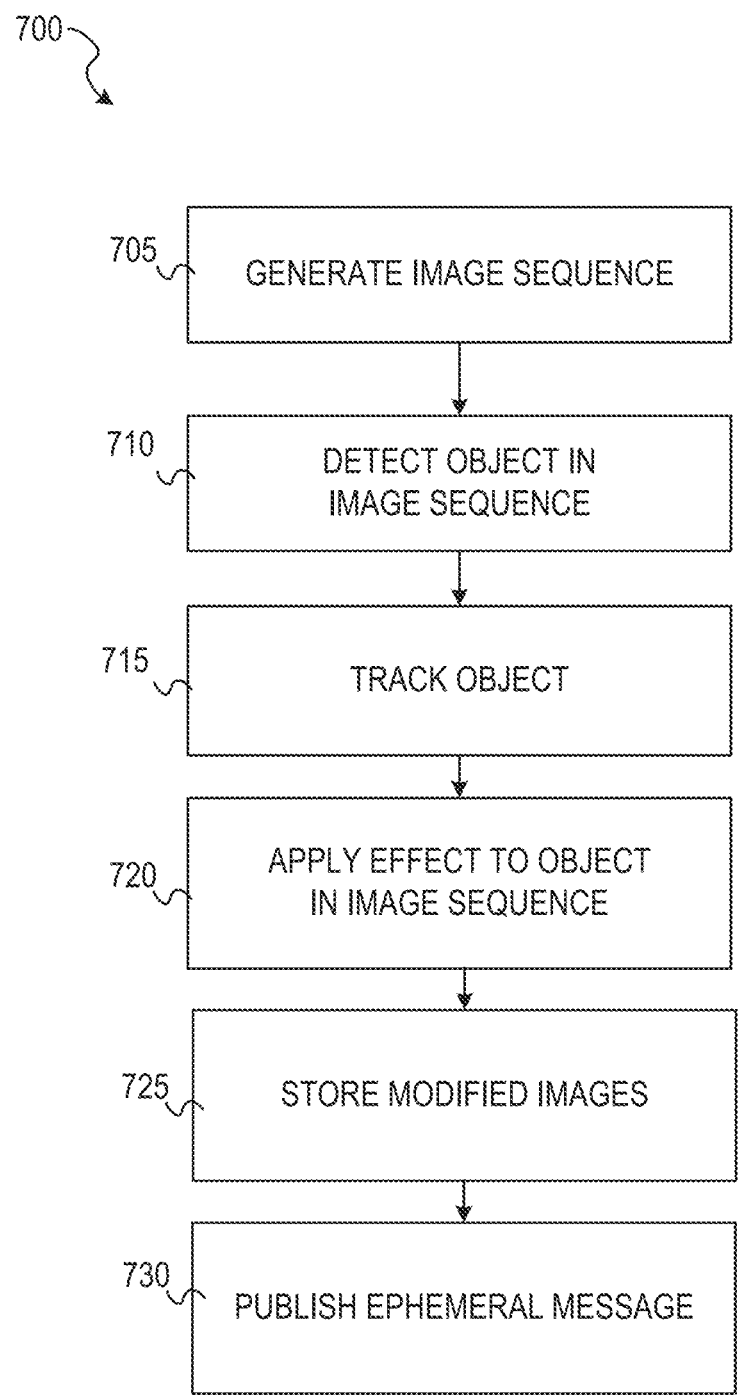
FIG. 7 shows an example flow diagram of a method for implementing a landmark detection system and applying an image effect, according to some example embodiments.

FIG. 7 shows an example flow diagram of a method 700 for implementing a landmark detection system and applying an image effect, according to some example embodiments. At operation 705, the interface engine 605 generates an image sequence. For example, at operation 705, the interface engine 605 generates a video using an image sensor of a client device 110. At operation 710, the detection engine 610 detects an object in an image from the image sequence. For example, the detection engine 610 detects an object in an initial frame of the video and generates landmark data for subsequent frames of the video, as discussed in further detail with reference to FIG. 8 below.

At operation 715, the tracking engine 615 tracks the object across multiple images of the image sequence. For example, at operation 715, the tracking engine 615 monitors the landmark data generated for each of the frames of the video, determines that the object is no longer being tracked correctly, and restarts detection (e.g., initializes operation 710), as discussed in further detail below with reference to FIG. 9.

At operation 720, the content engine 620 applies an effect to the object in the one or more images of the image sequence. For example, at operation 710 the content engine 620 uses the landmark data that indicates the location of eyes to overlay cartoon glasses on a user's face depicted in the video.

At operation 725, the storage engine 625 stores images with the applied effect as modified images in memory of a client device 110. At operation 730, the storage engine 625 publishes the modified images as an ephemeral message. For example, the storage engine 625 transmits the modified images to social network system 122 which publishes the modified image as an ephemeral message (e.g., ephemeral message 504) for download and viewing by other client devices, as discussed above.

Figure 8:
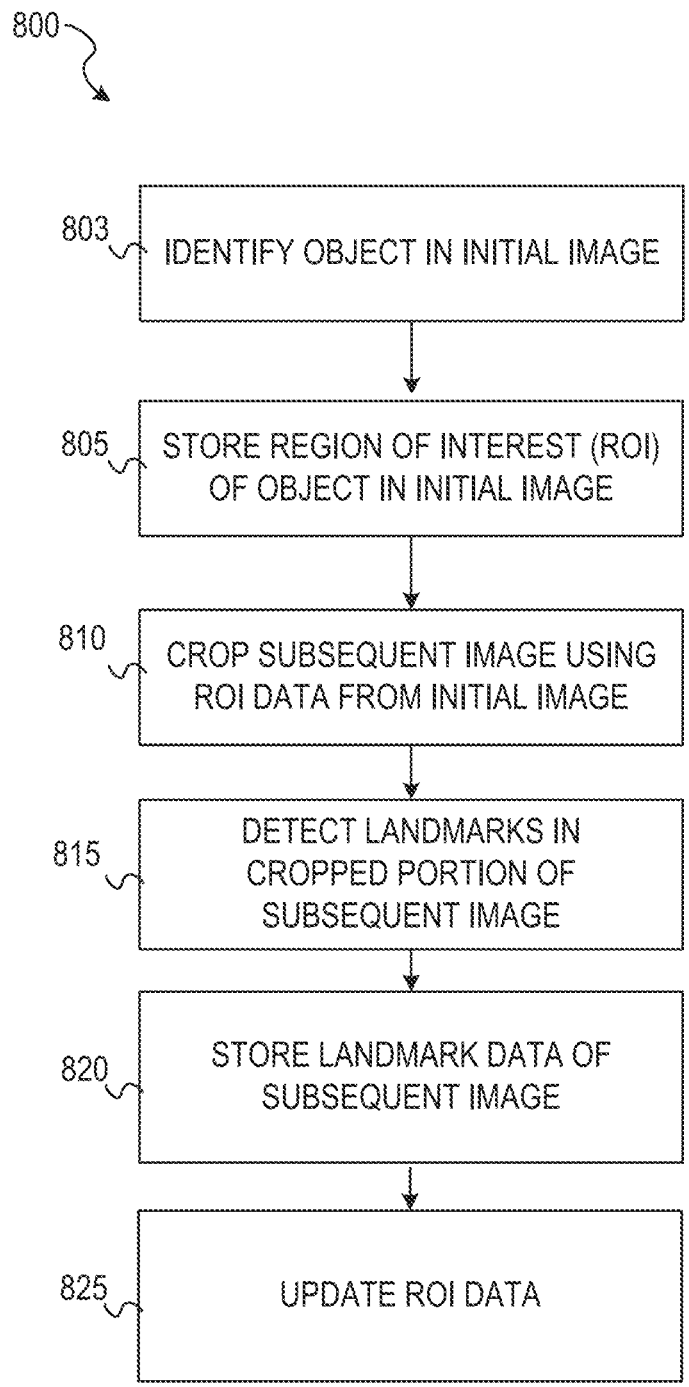
FIG. 8 shows an example flow diagram of a method for detecting an object, according to some example embodiments.

FIG. 8 shows an example flow diagram of a method 800 for detecting an object, according to some example embodiments. The operations of method 800 may be performed as a subroutine of operation 710 in which an object is detected in an image sequence. At operation 803, the detection engine 610 identifies an object in an initial image. For example, at operation 803 the detection engine 610 implements an object detection convolutional neural network to detect an object in the first frame of a video sequence. At operation 805, the detection engine 610 stores the location of the detected object within the image as ROI data. In some example embodiments, the location of the object stored as ROI data includes padding space (e.g., 10 pixels on the top, bottom, and sides) to allow the object to be detected via landmark data generation in later frames even if the object moves from the initial location.

At operation 810, the detection engine 610 analyzes the subsequent image in the image sequence and crops a subsequent image using the ROI data generated from the initial image (e.g., generated at operation 803 using the object detection convolutional neural network). For example, the subsequent frame is cropped using the ROI data created using the first frame (e.g., the location data plus padding describing the location of the object in the first frame) under an assumption that the object is approximately near or within the ROI data of the previous frame. At operation 815, the detection engine 610 detects landmarks in the cropped portion of the subsequent image, as described in further detail below in FIG. 10A.

At operation 820, the detection engine 610 stores landmark data generated from the subsequent image for further processing. The stored landmark data can be used for multiple tasks including, at least, (1) applying an image effect to the subsequent image using the landmark data (e.g., identifying locations to apply an effect or overlay content), and (2) evaluating whether the object is correctly being tracked by analyzing the confidence and/or variance of the landmark data, as discussed in further detail with reference to FIG. 9.

At operation 825, the detection engine 610 updates the ROI data. For example, at operation 825 the detection engine 610 updates the ROI data with the ROI data generated using the subsequent image. In some example embodiments, a current ROI variable can be declared and set to the location of the object at operation 805; then at operation 825, the current ROI variable is updated with the data values generated using the subsequent frame (which may be the same if the object has not moved but will be different if the object moved and is at a different location in the subsequent frame) to set the location of the object (e.g., to the same location or to a different location). By generating landmark data based on ROIs from previous frames, the landmark system 210 can efficiently generate landmark data for image effects and passively track the object. Although in the above example cropping is used, it is appreciated that in some example embodiments the images are not cropped but rather ROI data is used to direct the landmark generation scheme (e.g., illustrated in FIG. 10A) to the ROI area within a given image (that is, the landmark generation scheme is directed to the ROI within the image).

Figure 9:
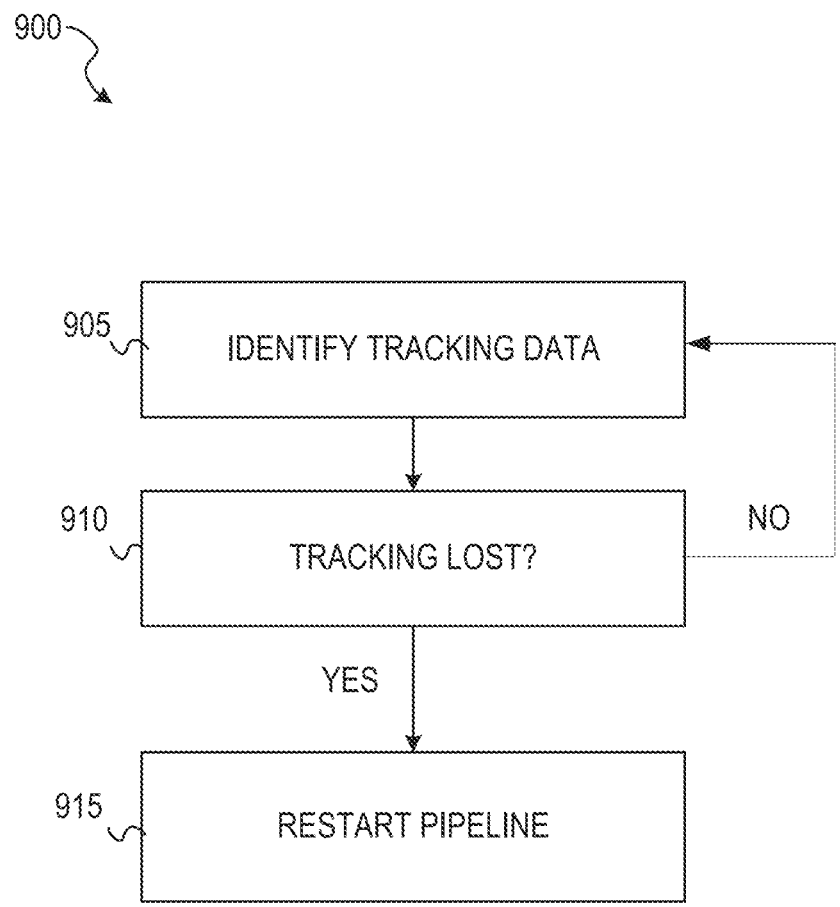
FIG. 9 shows a flow diagram of a method for tracking an object across multiple images, according to some example embodiments.

FIG. 9 shows a flow diagram of a method 900 of tracking an object across multiple images, according to some example embodiments. At operation 905, the tracking engine 615 identifies tracking data. For example, the tracking engine 615 identifies the landmark data of a face (e.g., a human user's face) generated for a current frame of an image sequence. At operation 910, the tracking engine 615 determines whether the correct object is being tracked, where the correct object is the object initially detected using the object detection neural network at operation 803. An object may no longer be tracked if the object is not located in the ROI for the given frame, another object (e.g., a cat face near the object) or similar object (e.g., a face-like object such as a power outlet on a wall in the background) has appeared in a given ROI and landmark data was generated for that new object instead of the original object, and so on.

In some example embodiments, the tracking engine 615 uses landmark data to perform tracking. In these embodiments, the landmark data (e.g., a heat map) is referred to as a persistence mask that comprises a confidence value for each pixel or cell in the persistence map. The confidence value of each pixel or cell of the persistence mask is treated as a probability that the tracked object is in a desired location. For example, if generated mask has low confidence in all or some the pixels/cells, the tracking engine 615 determines that tracking is lost at operation 910. In some embodiments, a threshold is used to determine whether tracking is lost. For example, if a specified portion of the pixels/cells in a given persistence mask has low confidence values for tracking, tracking is determined to be lost (e.g., if 100% of the pixels have low confidence values, then tracking is lost; if 60% of the cells have low confidence values, then tracking is lost; and so on). Further, a low confidence value can also be preset as a configuration value. For example, a confidence value can be preset to 80% indicating that if a confidence value for a pixel/cell is below 80%, the pixel/cell would be determined to have a low confidence.

Further, in some example embodiments, if a landmark has high variance parameters, then the tracking engine 615 determines that tracking is lost. For example, if the variance for a mouth area landmark is higher than a prespecified value, then the tracking engine 615 determines that tracking is lost at operation 910.

Continuing, at operation 910, if the tracking engine 615 determines that tracking is not lost, the method 900 loops to operation 905 in which the tracking data for a new image (e.g., next frame in video) is identified and then analyzed again at operation 910, until there are no more images. On the other hand, if at operation 910 the tracking engine 615 determines that tracking is lost, the method 900 continues to operation 915 in which the tracking engine 615 restarts the landmark-based object detection pipeline (e.g., operation 710, FIG. 7). For example, at operation 915, the detection engine 610 uses an object detection neural network to detect the object in a new image after the point at which tracking was lost and stores ROI data using the new image. For instance, if a human face is no longer in the image then at operation 910 the tracking engine 615 determines that tracking is lost and restarts the pipeline at operation 915, which initiates the object detection convolutional neural network to attempt to re-identify a human face in a new frame (operation 803) and initiate landmark generation as discussed above with reference to FIG. 7 and FIG. 8.

In some example embodiments, a tracking sub-network is used to generate a new ROI to restart the pipeline at operation 915. For example, an object classification neural network model in a task layer of a multi-task neural network can be trained to classify the object detected in the image (e.g., a current image of the video feed). The region of the image detected as the object is then set as the new updated ROI value in operation 825, according to some example embodiments.

Figure 10A:
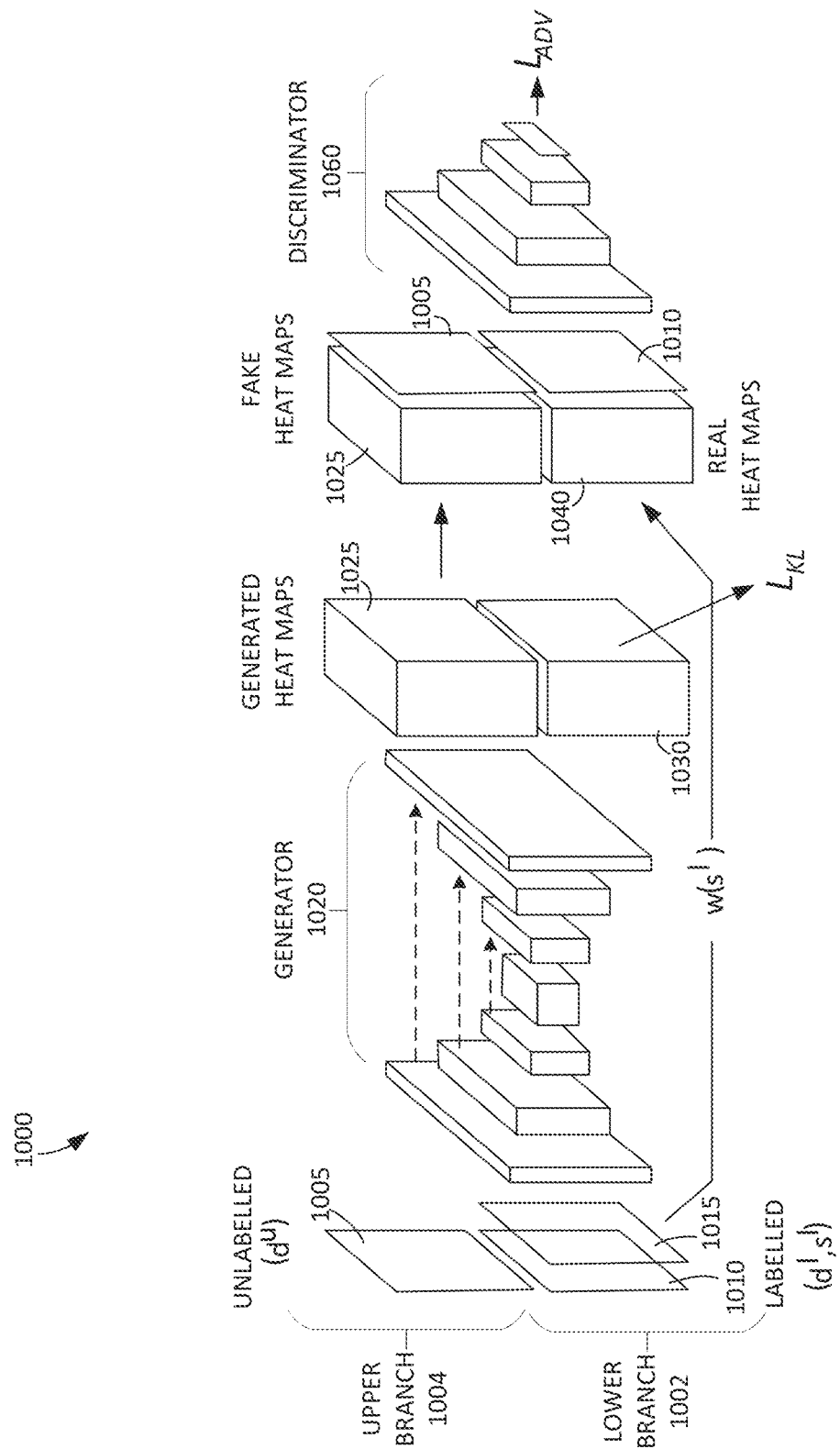
FIG. 10A shows an example architecture for a detection engine, according to some example embodiments.

FIG. 10A shows an example landmark detection architecture 1000 for the detection engine 610, according to some example embodiments. Although FIG. 10A shows only a detection architecture 1000, it is appreciated that the detection engine 610 comprises additional architectures, such as object detection neural network and a cropping scheme as discussed above. In the example illustrated, the architecture comprises a lower branch 1002 for processing labeled training data (e.g., image 1010 and landmark data 1015) and an upper branch 1004 for processing unlabeled data (e.g., image 1005). In some example embodiments, the architecture 1000 is configured as a semi-supervised network that is initially trained using the lower branch 1002 on labeled data (e.g., 3,000 images of cat faces with landmarks labeled) and then trained using the upper branch 1004 on unlabeled data (e.g., 100,000 unlabeled images of cat faces).

As a high-level summary, labeled data (e.g., image 1010 and landmark data 1015) is first input into the generator 1020 to generate heat maps (e.g., heat map 1030) in a training process using the KL (e.g., "$L_{KL}$" in FIG. 10A). After the generator 1020 is trained using the available labeled training data, the generator 1020 is trained using unlabeled data in the upper branch 1004. For example, the image unlabeled data (e.g., image 1005) is input into the generator 1020 to generate a simulated or "fake" heat map, such as fake heat map 1025. Fake data (e.g., fake heat map 1025 concatenated on its source image, image 1005) and real data (e.g., real heat map 1040 concatenated on its source image, image 1010) is then provided to the discriminator 1060, which determines whether the fake data is genuine or not. The upper branch 1004 can be trained end-to-end on the unlabeled training data set, which can be far larger and easier to obtain than the initial training data set. In this way, the generator 1020 can be trained with data never seen before (e.g., training images in the unlabeled dataset that were not used in the initial training image in the labeled dataset).

In the more detailed description of architecture 1000, paired labeled data is denoted as (d, s), where d is an image, and s is the ground-truth pixel locations of the landmarks, and unpaired data is denoted as unlabeled data ($d^u$). As mentioned, conventional approaches use L1 and L2 norms to determine error between predicted and ground-truth landmarks: $e=\tilde{s}-s$, where $\tilde{s}$ are the predicted landmarks. There are at least two issues with this convention: first, such an objective only accounts for the mean or location of a prediction and does not penalize for differences in variance or scale; second, such a family of objectives requires paired training samples (e.g., (d, s)). Frequently, obtaining paired training data is problematic, especially considering the difficultly for even human annotators to provide precise landmark locations for an image; all while unlabeled training data is available in large amounts.

In the Labeled Training Data Case:

The joint distribution of the landmarks is denoted as: $s \in \mathbb{R}^{K \times 2}$ and image $d \in \mathbb{R}^{h \times w \times 3}$ as p(d, s), where K is the number of landmarks. The form of the distribution p(d, s) is unknown, but for labeled data joint samples are available: (d, s)~p(d, s). In some example embodiments, the system 210 learns a conditional distribution $q_\theta(s|d)$ modeled by a neural network with parameters θ. Landmark detection is then implemented by sampling $\tilde{s} \sim q_\theta(s|d)$. In the following, the neural network parameters θ are omitted for brevity of notation. In some example embodiments, the network is trained by minimizing the following loss function with respect to the neural network parameters as follows:

$$\mathcal{L}(\theta) = \mathbb{E}_{(d,s) \sim p(d,s)} \|\tilde{s} - s\|_2 \quad [\text{Eq. 1}]$$

In some alternative example embodiments, the system 210 trains a neural network to predict normalized probability maps or heat maps (h):$\tilde{h} \sim q(h|d)$, where $h \in \mathbb{R}^{K \times h \times w}$ and each $h_k \in \mathbb{R}^{h \times w}$ represents a normalized probability map for the landmark k, k=1 . . . K. To obtain pixel coordinates, the system 210 performs an argmax operation over each heat map: $\tilde{s} = \text{argmax}(\tilde{h})$. However, in some implementations, such an operation is not directly differentiable and therefore is not used for end-to-end network training.

In some example embodiments, a differential variant termed "softargmax" is implemented. For the 1-D case the differential variant can be implemented as:

$$softargmax(\beta h) = \sum_x softmax(\beta h_x) \cdot x = \sum_x \frac{e^{\beta h_x}}{\sum_j e^{\beta h_x}} \cdot x = \sum_x p(x) \cdot x = \mathbb{E}_h[x] \quad [\text{Eq. 2}]$$

where $h_x$ is the predicted probability mass at location x, where $\Sigma_j e^{\beta h_x}$ is the normalization factor, and further where $\beta$ is the temperature controlling factor of the predicted distribution. The two-dimensional coordinate is denoted with boldface letter: $x=(x_1, x_2)$ and the 2D softargmax operation is written as $\mathbb{E}_h[x]$. Softargmax is integrated into Eq. 1 as follows:

$$\mathcal{L}_{SAM} = \mathbb{E}_{(d,s) \sim p(d,s)} \|\mathbb{E}_h[x] - s\|_2 \quad [\text{Eq. 3}]$$

The softargmax operation is the expectation of a pixel coordinate over the selected dimension. Hence, the softargmax-based loss assumes the underlying distribution can be parametrized with its mean or location only. If the mean of the predicted distribution matches the mean of the true distribution, such a loss function will take low values and will not provide further guiding for the network. To avoid such cases, according to some example embodiments, when the trained model is uncertain about the predicted mean, while still yielding low error, the system 210 parametrizes the distribution using $\{\mu, \sigma\}$, where μ is mean or location and a is variance or scale parameter of the selected distribution.

In some example embodiments, the system 210 configures the model to be certain about the predictions and have a low variance or scale. Consider two parametric distributions: Gaussian(μ, σ) and Laplace (μ, b) with $\sigma^2 = \mathbb{E}_h[(x - \mathbb{E}_h[x])^2]$ and $b = \mathbb{E}_h[|x - \mathbb{E}_h[x]|]$. To go from the heat map representation to the actual landmark coordinates, a function τ(ĥ) computes the location (mean) and the scale (variance) given predicted heat maps ĥ for a Laplace (Gaussian) distribution. Landmark(s) localization is then performed by taking expectation $\tilde{s} = \mathbb{E}[\tau(\tilde{h})]$, according to some example embodiments.

Denoting the true conditional distribution of the landmarks as p(s|d), the objective is defined as follows:

$$\mathcal{L}_{KL} = \mathbb{E}_{(d,s) \sim p(d,s)} [D_{KL}(\tau(\tilde{h}) \| p(s|d))] \quad [\text{Eq. 4}]$$

where $D_{KL}$ is the KL-divergence. A true distribution is assumed for the case of Gaussian (i.e., Gaussian(μ, 1), where μ is the ground truth locations of the landmarks). For the case with Laplace: Laplace(μ, 1) can be likewise sought. KL-divergence conveniently has a closed-form solution for these distribution families. In some example alternative embodiments, the solution is approximated by sampling.

In the Unlabeled Training Data Case:

As discussed, in some example embodiments, the system operates without using paired or fully labeled data (i.e., $(d^l, s^l)$). As used here, data samples are denoted with the superscript l to distinguish them from unpaired or unlabeled data ($d^u$). Generally, it is difficult for a human to label many images with landmarks; not only due to the time required for labeling a multitude of images, but also due to difficulty in discerning accurate locations of difficult to discern landmarks. Hence, while unlabeled data may be more common, it is usually unusable in conventional approaches.

In some example embodiments, the system 210 is configured to use unlabeled data using an adversarial learning framework for landmark localization. In some example embodiments, the landmarks prediction network is treated as a generator G=q(h|d). The discriminator takes the form D([d, h]), where [•, •] is a tensor concatenation operation. The real samples for the discriminator are defined as $\{d^l, h=w(s^l)\}$, where w(•) generates the true heat maps given the ground truth landmarks locations. Fake samples are defined as $\{d^u, \tilde{h} \sim q(h|d^u)\}$. With this notation, the min-max objective for landmark localization is defined as:

$$\min_G \max_D \mathcal{L}_{adv}(D, G) \quad [\text{Eq. 5}]$$

where $\mathcal{L}_{adv}(D, G)$ writes as:

$$\mathbb{E}_{(d^l, s^l) \sim p(d,s)}[\log D([d^l, w(s^l)])] + \mathbb{E}_{(d^u) \sim p(d)}[\log(1 - D([d^u, G(d^u)]))] \quad [\text{Eq. 6}]$$

The discriminator has a goal of learning how attributes of real heat maps appear for a given input image, while the generator has a goal of producing heat maps that are indistinguishable from real heat maps. Within this framework, the discriminator is intended to provide additional guidance to the generator by learning on both labeled and unlabeled data, according to some example embodiments. The objective in Eq. 5 is solved using alternating updates, according to some example embodiments.

In some example embodiments, the system 210 is trained using the following training scheme T to update steps of the model.

```
::::::::::::::::CODE BEGIN::::::::::::::::
Data: {(d_t^l, d_t^l) i=1,...,n, {(d_t^u) i=1,...,m,
θ_D, θ_G ← initialize network parameters
while t ≤ T do
  | (D_t^l, S_t^l) ← sample mini-batch from labeled data
  | (D_t^u) ← sample mini-batch from unlabeled data
  | H_fake ← G(D_t^u)
  | H_real ← w(S_t^l)
  | L_adv ←
  |   log D ([D_t^l, H_real]) + log(1−D([D_t^u, H_fake])
  | L_G ← compute loss using Eq. 2 or Eq. 4
  | //update model parameters
  | θ_D ← − ∇_{θ_D} L_adv
  | θ_G ← − ∇_{θ_G} (L_G − L_adv)
end
::::::::::::::::CODE END::::::::::::::::
```

Figure 10B:
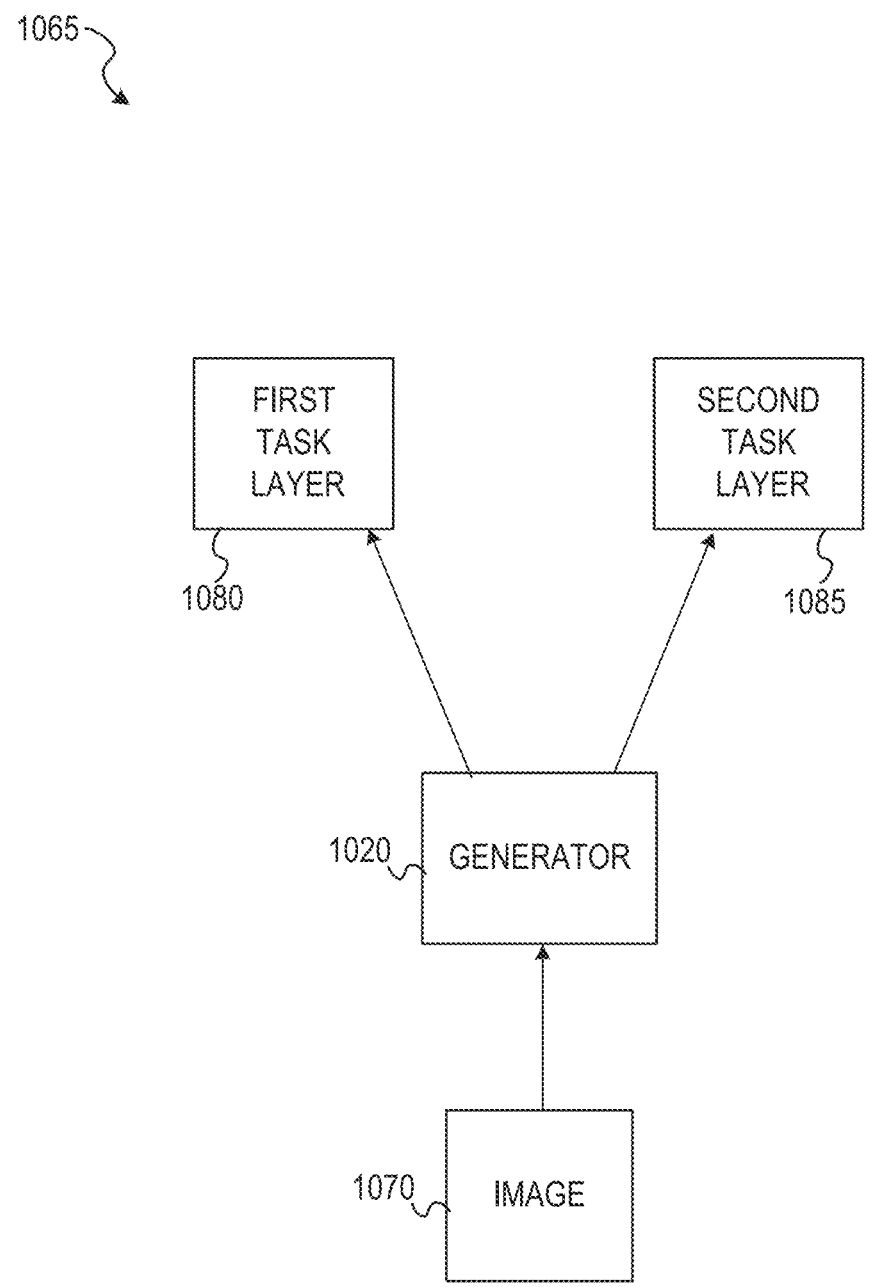
FIG. 10B shows an example architecture for a multi-task detection engine, according to some example embodiments.

FIG. 10B shows an example detection engine multi-task architecture 1065, according to some example embodiments. The generator 1075 is an example of the generator 1020 of FIG. 10A that is trained using architecture 1000 in a semi-supervised approach, as discussed above. The architecture 1065 is configured as a multi-task neural network, in which a plurality of task specific layers (e.g., first task layer 1080 and second task layer 1085 are trained end-to-end with the generator network 1020 to perform different tasks. In some example embodiments, the first task layer 1080 is configured to generate landmark data as discussed above, which can then be used to perform image processing, as discussed below with reference to FIGS. 12 and 13.

Further, the second task layer 1085 is configured to perform object classification of the object depicted in the ROI. The object classification value can be used to perform tracking. For example, if the second task layer 1085 generates a low likelihood that the image 1070 is of a cat, then the pipeline can be restarted as discussed above with reference to FIG. 9. In some example embodiments, the new ROI (in a restarted pipeline) is set to the ROI of the object area as detected by the object classification network. In some example embodiments parameters are shared between the task layers in a hard parameter multi-task approach, as is appreciated by one having ordinary skill in neural networks. Further, according to some example embodiments, the multi-task layers are implemented as a soft parameter sharing approach in which each task comprises a model for that specific task and parameters are not shared between tasks.

Figure 11:
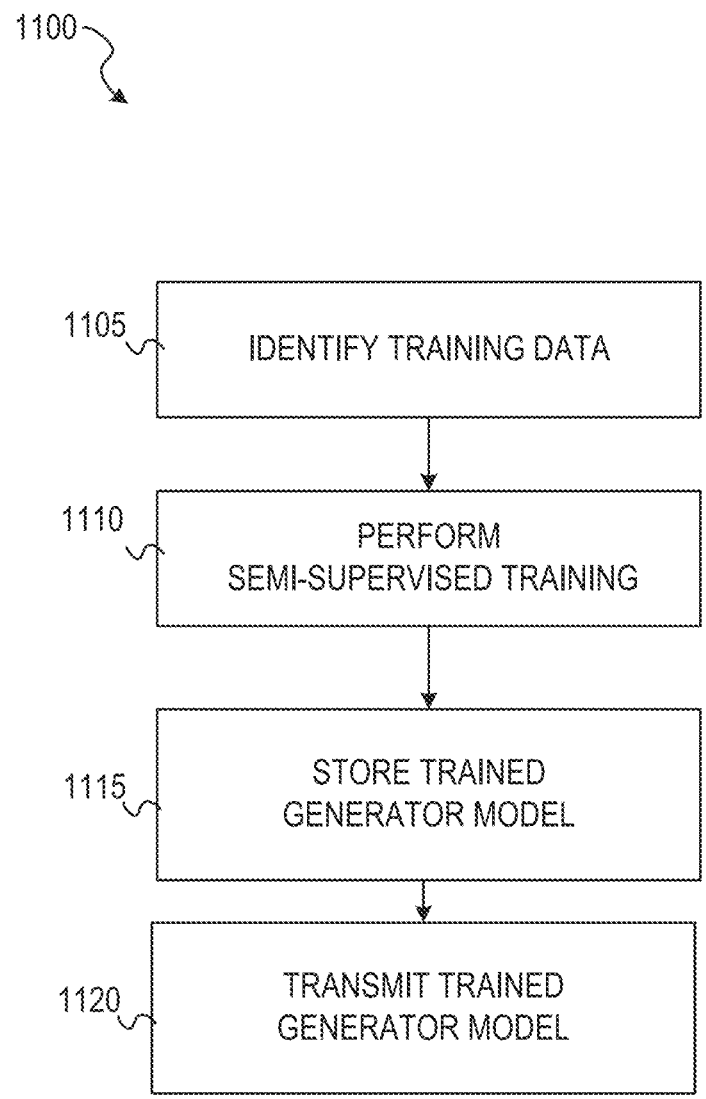
FIG. 11 shows a flow diagram of a method for training a landmark detection system, according to some example embodiments.

FIG. 11 shows a flow diagram of a method 1100 for training the landmark detection system, according to some example embodiments. In the example of FIG. 11, the method 1100 can be performed by a server-side landmark system, e.g., landmark system 150, that trains a landmark detection model and then transmits it to client-side instances of the landmark detection system (e.g., landmark system 210 in FIG. 2) for application to images generated on the respective client devices.

At operation 1105, the training engine 630 identifies training data, such as a set of labeled images and unlabeled images. For example, at operation 1105 a server-side training (e.g., in landmark system 150) identifies training data in database 126. At operation 1110, the training engine 630 performs semi-supervised training of a generator model as discussed above, with reference to FIG. 10. In particular, and in accordance with some example embodiments, the training engine 630 combines a softargmax-based loss with the adversarial loss in the following fashion:

$$\min_G(\min_D(\lambda \cdot \mathcal{L}_{adv}(G,D)) + \mathcal{L}_{adv}(G)) \quad [\text{Eq. 7}]$$

where the KL-divergence version of the objective is defined as:

$$\min_G(\min_D(\lambda \cdot \mathcal{L}_{adv}(G,D)) + \mathcal{L}_{KL}(G)) \quad [\text{Eq. 8}]$$

with λ weighting the importance of the adversarial loss. This training objective includes both labeled and unlabeled data, according to some example embodiments. It has been experimentally observed that the above combination can yield significantly improved results. As such, while merely implementing a softargmax-based model may result in inefficiently labeled data (since the heat maps predicted by such models are very different from the real heat maps), the above combination approaches (e.g., equation 7, equation 8) result in efficient to use, easier-to-obtain unlabeled data in such a way that results in accurate landmark generation.

After training is complete, at operation 1115 the training engine 630 stores the trained generator model (e.g., generator 1020 without the discriminator 1060). At operation 1120, the training engine 630 transmits the trained generator model to instances of the landmark system installed on different client devices 110.

Figure 12:
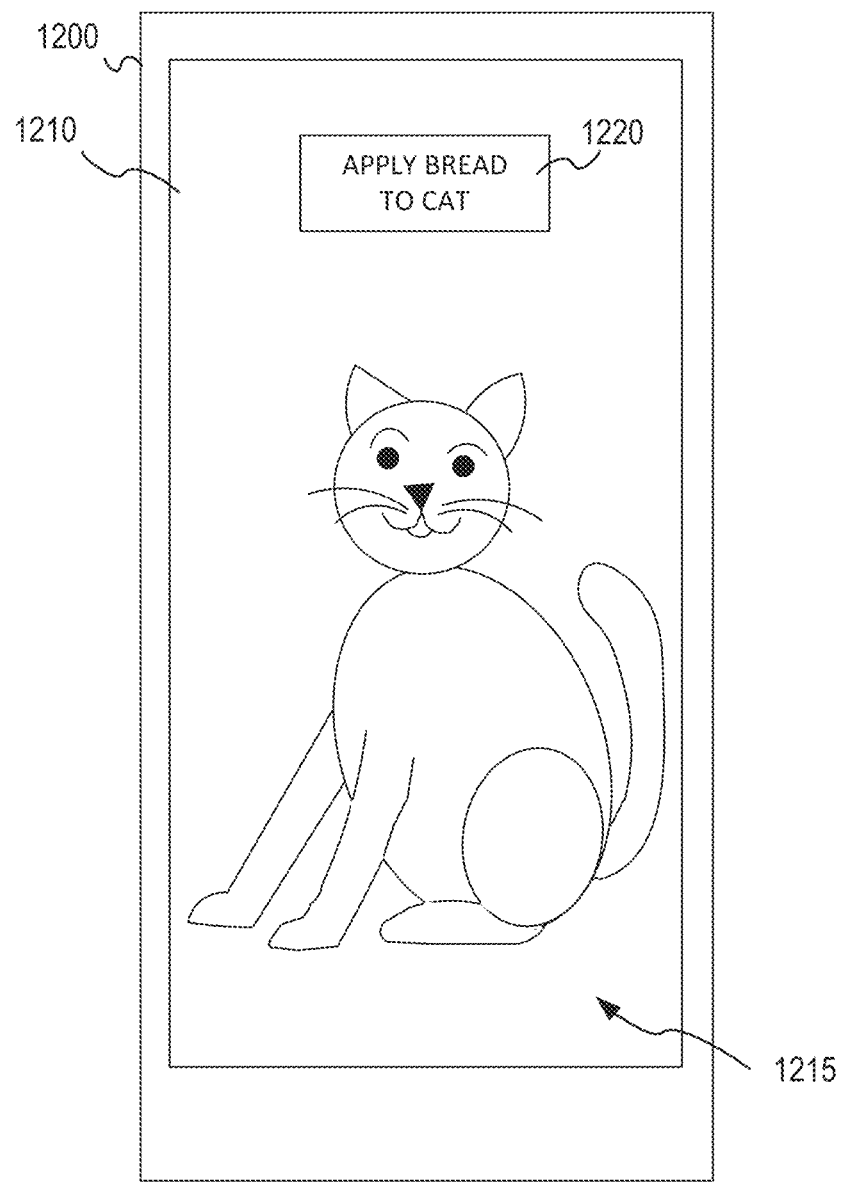
FIGS. 12 and 13 show example user interfaces implementing a landmark system, according to some example embodiments.
Figure 13:
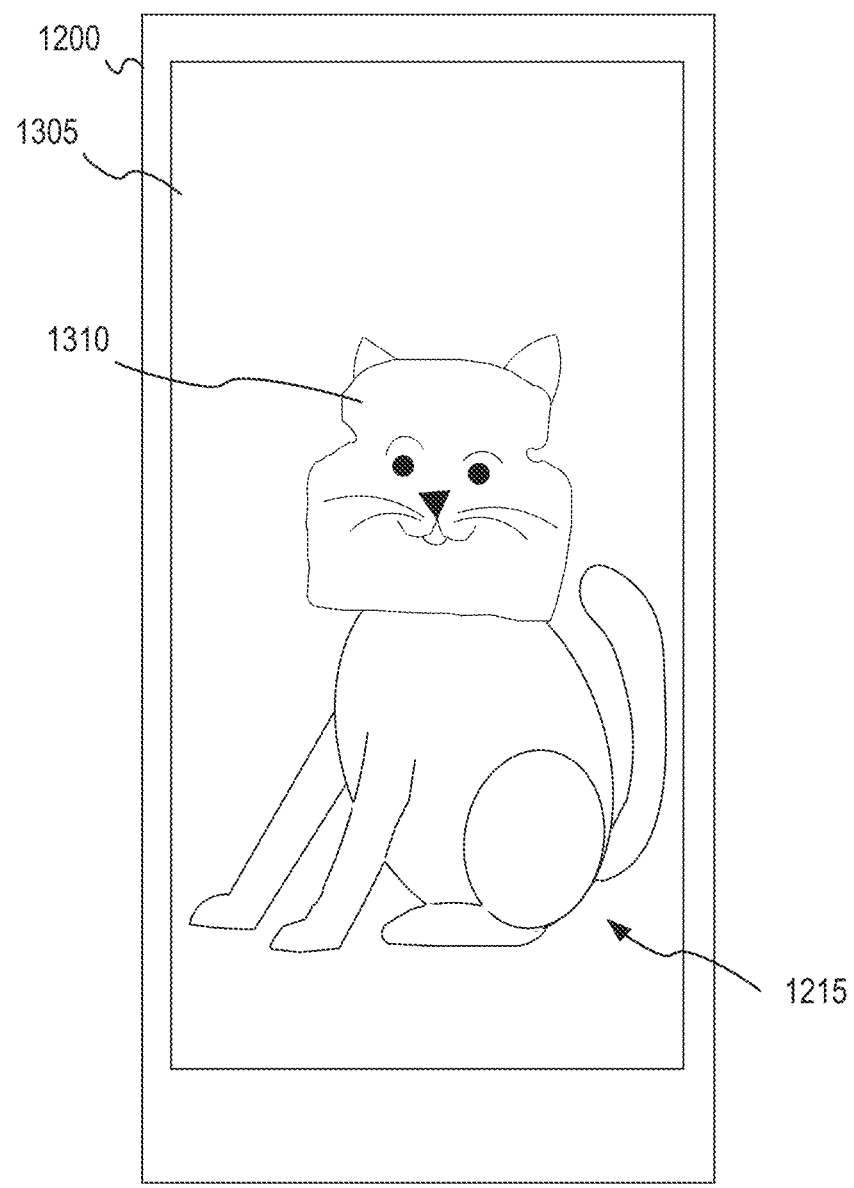

FIGS. 12 and 13 show example user interfaces implementing a landmark system, according to some example embodiments. In FIG. 12, a client device 1200 is displaying a user interface 1210 comprising an image of a cat 1215 and a button 1220 that prompts the user to apply an image effect to the image of the cat 1215. Assuming the user selects the button 1220, a landmark system (e.g., landmark system 210, FIG. 2) initiates a generator model to apply an image effect. For example, turning to FIG. 13, responsive to the user selecting button 1220, the landmark system of the device 1200 is initiated to generate image 1305 in which the face of the cat 1215 has been integrated with a piece of bread 1310 (e.g., user interface content). Although two single images are displayed in FIGS. 12 and 13, it is appreciated that the landmark detection system can detect landmarks for image effect and tracking purposes in real time or near real time as the user of the device 1200 views his cat 1215.

Further, although processing using a cat is discussed here an example, it is appreciated that the landmark system 210 can perform landmark detection and/or tracking of a variety objects. For example, the landmark system 210 can be trained to apply image processing on images of a Labradoodle, which is a modern breed of dog for which a large set of labeled landmark training data may not exist. In this example embodiment, the landmark system 210 is initially trained on a small set of labeled landmark images of Labradoodles (e.g., supervised training), and then trained on a larger set of unlabeled images of Labradoodles (e.g., unsupervised training). After training, a user of a client device can an implement the trained landmark system 210 to apply an image effect to live video of the user's Labradoodle and/or perform tracking of the Labradoodle's face within the live video.

Figure 14:
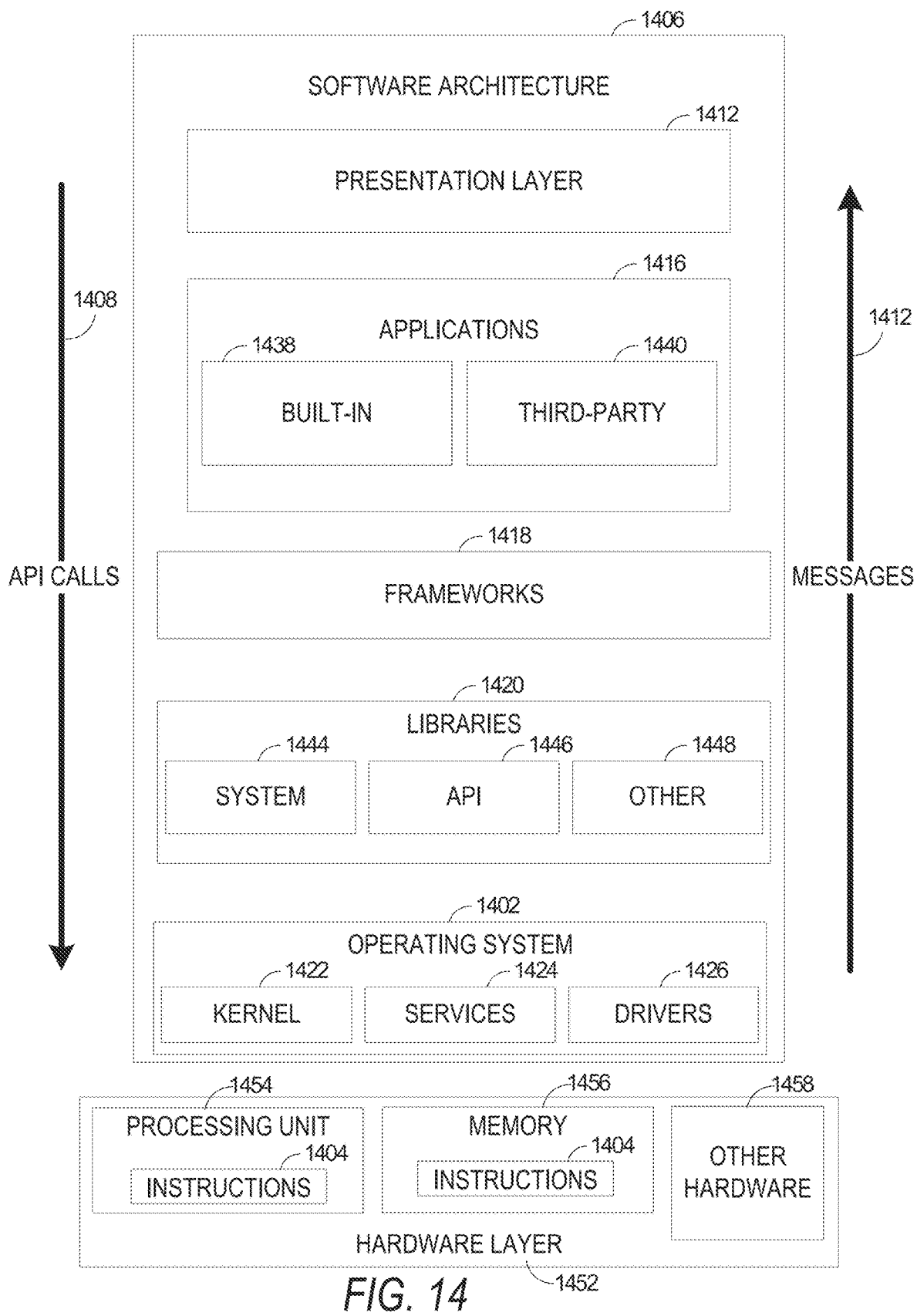
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture, and it will be appreciated that many other architectures may be implemented to facilitate the functionality described herein. The software architecture 1406 may execute on hardware such as a machine 1500 of FIG. 15 that includes, among other things, processors, memory, and I/O components. A representative hardware layer 1452 is illustrated and can represent, for example, the machine 1500 of FIG. 15. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes a memory/storage 1456, which also has the executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1516, and a presentation layer 1414. Operationally, the applications 1516 and/or other components within the layers may invoke API calls 1408 through the software stack and receive a response in the form of messages 1412. The layers illustrated are representative in nature and not all software architectures have all layers. For example, some mobile or special-purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1516 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1516 and other software components/modules.

The frameworks/middleware 1418 provide a higher-level common infrastructure that may be used by the applications 1516 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1516 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as the operating system 1402) to facilitate functionality described herein.

The applications 1516 may use built-in operating system functions (e.g., kernel 1422, services 1424, and/or drivers 1426), libraries 1420, and frameworks/middleware 1418 to create user interfaces to interact with users of the system. Alternatively, or additionally, in some systems, interactions with a user may occur through a presentation layer, such as the presentation layer 1414. In these systems, the application/component "logic" can be separated from the aspects of the application/component that interact with a user.

Figure 15:
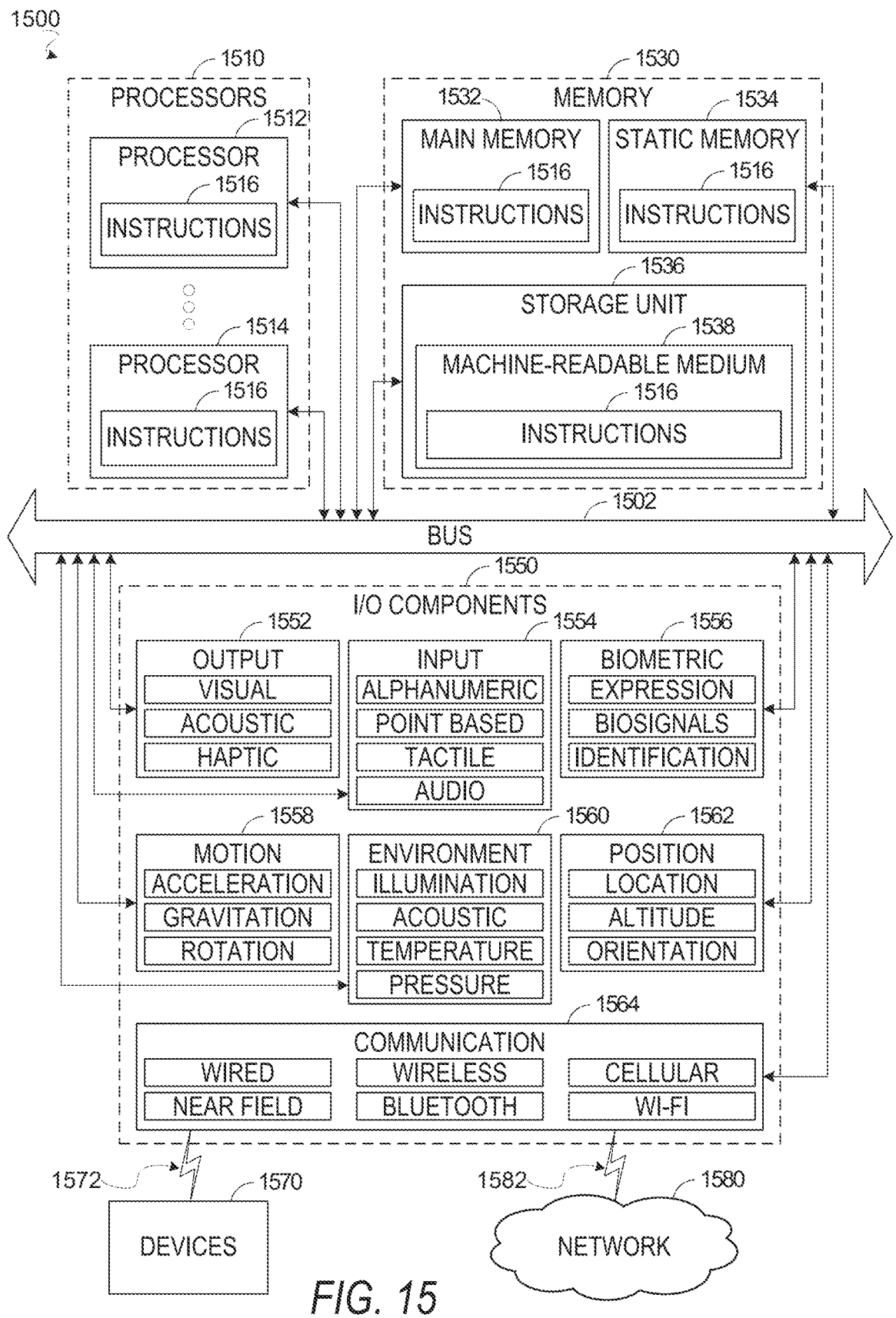
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. As such, the instructions 1456 may be used to implement modules or components described herein. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. The memory/storage 1530 may include a main memory 1532, static memory 1534, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1436 (e.g., on machine readable-medium 1538), within at least one of the processors 1510 (e.g., within the processor cache memory accessible to processors 1512 or 1514), or any suitable combination thereof, during execution thereof by the machine 1500. Accordingly, the memory 1532, the storage unit 1536, and the memory of the processors 1510 are examples of machine-readable media.

The I/O components 1550 may include a wide variety of components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environment components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environment components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or other suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions 1516 for execution by the machine 1500, and includes digital or analog communications signals or other intangible media to facilitate communication of such instructions 1516. Instructions 1516 may be transmitted or received over the network 1580 using a transmission medium via a network interface device and using any one of a number of well-known transfer protocols.

"CLIENT DEVICE" in this context refers to any machine 1500 that interfaces to a network 1580 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1580.

"COMMUNICATIONS NETWORK" in this context refers to one or more portions of a network 1580 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1580 may include a wireless or cellular network and the coupling 1582 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1516 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions 1516 (e.g., code) for execution by a machine 1500, such that the instructions 1516, when executed by one or more processors 1510 of the machine 1500, cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1512 or a group of processors 1510) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1500) uniquely tailored to perform the configured functions and are no longer general-purpose processors 1510.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1512 configured by software to become a special-purpose processor, the general-purpose processor 1512 may be configured as respectively different special-purpose processors (e.g., comprising different hardware components) at different times. Software accordingly configures a particular processor 1512 or processors 1510, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1510 that are temporarily configured (e.g., by software) or permanently configured to perform the relevant operations. Whether temporarily or permanently configured, such processors 1510 may constitute processor-implemented components that operate to perform one or more operations or functions described herein. As used herein, "processor-implemented component" refers to a hardware component implemented using one or more processors 1510. Similarly, the methods described herein may be at least partially processor-implemented, with a particular processor 1512 or processors 1510 being an example of hardware. For example, at least some of the operations of a method may be performed by one or more processors 1510 or processor-implemented components. Moreover, the one or more processors 1510 may also operate to support performance of the relevant operations in a "cloud computing" environment or as a "software as a service" (SaaS). For example, at least some of the operations may be performed by a group of computers (as examples of machines 1500 including processors 1510), with these operations being accessible via a network 1580 (e.g., the Internet) and via one or more appropriate interfaces (e.g., an API). The performance of certain of the operations may be distributed among the processors 1510, not only residing within a single machine 1500, but deployed across a number of machines 1500. In some example embodiments, the processors 1510 or processor-implemented components may be located in a single geographic location (e.g., within a home environment, an office environment, or a server farm). In other example embodiments, the processors 1510 or processor-implemented components may be distributed across a number of geographic locations.

"PROCESSOR" in this context refers to any circuit or virtual circuit (a physical circuit emulated by logic executing on an actual processor 1512) that manipulates data values according to control signals (e.g., "commands," "op codes," "machine code," etc.) and which produces corresponding output signals that are applied to operate a machine 1500. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1510 may further be a multi-core processor 1510 having two or more independent processors 1512, 1514 (sometimes referred to as "cores") that may execute instructions 1516 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    generating an image from a plurality of images in an image sequence generated using an image sensor of a computing device;
    generating, using a generative machine learning scheme, landmark data by applying the generative machine learning scheme to the image, the generative machine learning scheme trained to compensate for dispersion of landmarks, the landmark data indicating one or more landmarks in the image;
    detecting an object depicted in the image using an object detection machine learning scheme;
    tracking the object in subsequent images of the image sequence using the generative machine learning scheme;
    determining, in one of the subsequent images, that the object is not being tracked; and
    resetting tracking of the object using the generative machine learning scheme,
    wherein the generative machine learning scheme is a first neural network and the object detection machine learning scheme is a second neural network.

2. The method of claim 1, further comprising:
    generating a modified image from the image using the landmark data; and
    storing the modified image.

3. The method of claim 2, wherein generating the modified image comprises:
    identifying locations of one or more landmarks in the image using the landmark data; and
    generating the modified image by applying an image effect to the image based on the locations of one or more landmarks in the image.

4. The method of claim 3, wherein the image effect includes overlaying user interface content on the image.

5. The method of claim 2, further comprising:
    publishing the modified image as a message on a network site.

6. The method of claim 1, wherein the generative machine learning scheme is further trained to compensate for mean of landmarks in training images.

7. The method of claim 6, wherein the dispersion is at least one of: a scale parameter of a Gaussian distribution, or a variance parameter of a Laplacian distribution.

8. The method of claim 7, wherein the training images comprise a labeled image set and an unlabeled image set, and the generative machine learning scheme is trained to compensate for dispersion of landmarks of one or more images in the labelled image set.

9. The method of claim 8, wherein the generative machine learning scheme is trained on the unlabeled image set using a discrimination layer.

10. The method of claim 9, wherein the generative machine learning scheme is initially trained on the labelled image set and then trained on the unlabeled image set.

11. The method of claim 9, wherein the generative machine learning scheme and the discrimination layer are trained end-to-end on a server.

12. The method of claim 11, further comprising:
    receiving, from the server, the generative machine learning scheme without the discrimination layer.

13. The method of claim 1, wherein tracking the object further comprises:
    determining region of interest (ROI) coordinates of the object in the image; and
    applying the generative machine learning scheme to the ROI coordinates in the subsequent images.

14. The method of claim 13, further comprising:
    updating the ROI coordinates of the object for each frame after generating landmark data from each respective frame, to correspond to a location of the object indicated by the landmark data for a given frame.

15. The method of claim 14, further comprises:
    generating cropped images by cropping each of the subsequent images using the ROI coordinates, wherein the generative machine learning scheme is applied to the cropped images of the images.

16. The method of claim 1, wherein resetting tracking comprises:
    reapplying the object detection machine learning scheme to one of the plurality of images; and
    tracking additional subsequent images using the generative machine learning scheme, the additional subsequent images being images subsequent to the one of the plurality of images in the image sequence.

17. The method of claim 1, wherein the object being tracked is an animal face, and the generative machine learning scheme is trained on images of animal faces.

18. A system comprising:
one or more processors of a machine;
an image sensor; and
a memory storing instructions that, when executed by the one or more processors, cause the machine to perform operations comprising:
generating an image from a plurality of images in an image sequence generated using an image sensor of a computing device;
generating, using a generative machine learning scheme, landmark data by applying the generative machine learning scheme to the image, the generative machine learning scheme trained to compensate for dispersion of landmarks, the landmark data indicating one or more landmarks in the image;
detecting an object depicted in the image using an object detection machine learning scheme;
tracking the object in subsequent images of the image sequence using the generative machine learning scheme;
determining, in one of the subsequent images, that the object is not being tracked; and
resetting tracking of the object using the generative machine learning scheme,
wherein the generative machine learning scheme is a first neural network and the object detection machine learning scheme is a second neural network.

19. A non-transitory machine-readable storage device embodying instructions that, when executed by a machine, cause the machine to perform operations comprising:
generating an image from a plurality of images in an image sequence generated using an image sensor of a computing device;
generating, using a generative machine learning scheme, landmark data by applying the generative machine learning scheme to the image, the generative machine learning scheme trained to compensate for dispersion of landmarks, the landmark data indicating one or more landmarks in the image;
detecting an object depicted in the image using an object detection machine learning scheme;
tracking the object in subsequent images of the image sequence using the generative machine learning scheme;
determining, in one of the subsequent images, that the object is not being tracked; and
resetting tracking of the object using the generative machine learning scheme,
wherein the generative machine learning scheme is a first neural network and the object detection machine learning scheme is a second neural network.

* * * * *